United States Patent
Maloberti et al.

[11] Patent Number: 5,348,423
[45] Date of Patent: Sep. 20, 1994

[54] DEVICE AND PROCESS FOR UNROLLING FLEXIBLE TUBULAR CONDUITS ESSENTIALLY VERTICALLY

[75] Inventors: René Maloberti, Champigny; Alain Coutarel, Paris, both of France; Philippe F. Espinasse, Rio de Janerio, Brazil

[73] Assignee: Coflexip, Boulogne-Billancourt, France

[21] Appl. No.: 776,394

[22] PCT Filed: Apr. 2, 1991

[86] PCT No.: PCT/FR91/00264
§ 371 Date: Jan. 29, 1992
§ 102(e) Date: Jan. 29, 1992

[87] PCT Pub. No.: WO91/15699
PCT Pub. Date: Oct. 17, 1991

[30] Foreign Application Priority Data
Mar. 30, 1990 [FR] France .................. 90 04105

[51] Int. Cl.⁵ .............................................. F16L 1/18
[52] U.S. Cl. .................... 405/166; 405/168.3; 405/168.4
[58] Field of Search ............ 405/158, 166, 167, 168.1, 405/168.3, 168.4

[56] References Cited

U.S. PATENT DOCUMENTS

| | | | |
|---|---|---|---|
| 4,068,490 | 1/1978 | Jegousse | 405/166 |
| 4,073,156 | 2/1978 | Smith . | |
| 4,486,123 | 12/1984 | Koch et al. | 405/166 X |

FOREIGN PATENT DOCUMENTS

| | | |
|---|---|---|
| 778202 | 7/1972 | Belgium . |
| 0054332 | 6/1982 | European Pat. Off. . |
| 1059932 | 2/1967 | United Kingdom . |

OTHER PUBLICATIONS

International Search Report, PCT/FR91/00264, Aug. 1991, European Patent Office.

*Primary Examiner*—David H. Corbin
*Attorney, Agent, or Firm*—Hoffman, Wasson & Gitler

[57] ABSTRACT

A device for laying flexible tubular conduits from a floating support comprises rigid accessories the outer diameter of which is greater than the outer diameter of the conduit. It comprises main, linear winch-type tensioning means (6) for normal lowering of the flexible conduit (3) to be laid. The linear winch has an essentially vertical axis and comprises the last means for guiding the flexible conduit at the level of the floating support (1) and auxiliary holding means (19) which hold the flexible conduit by means of an accessory (21) mounted on the flexible conduit, such as an end fitting or an auxiliary accessory, and enable the main tensioning means (6) to clear a section of flexible conduit on which the accessory (21) is mounted.

14 Claims, 4 Drawing Sheets

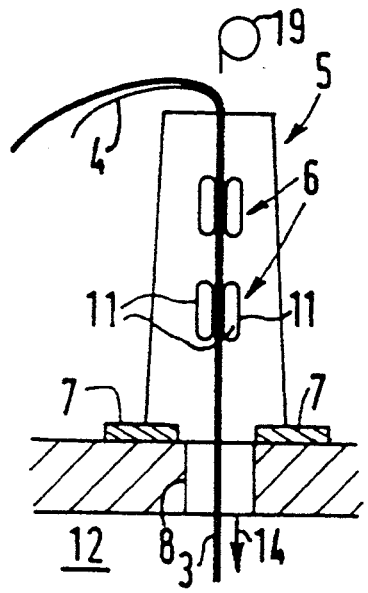
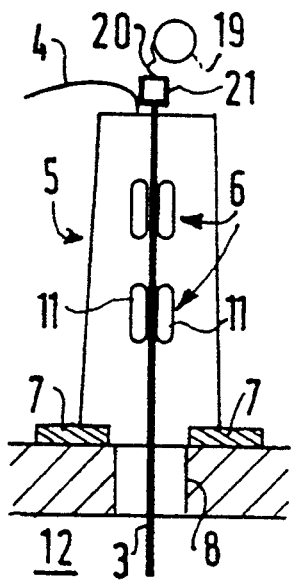
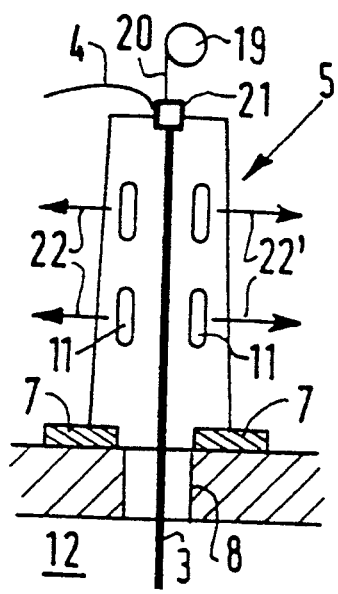
FIG. 2a     FIG. 2b     FIG. 2c
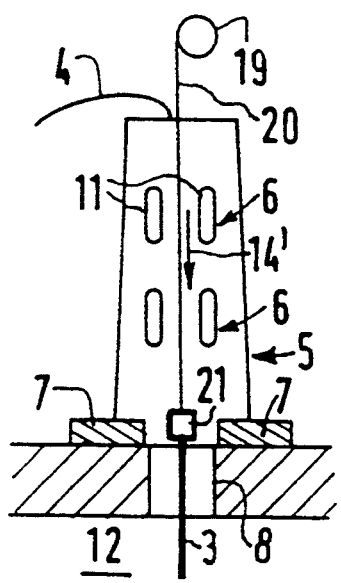
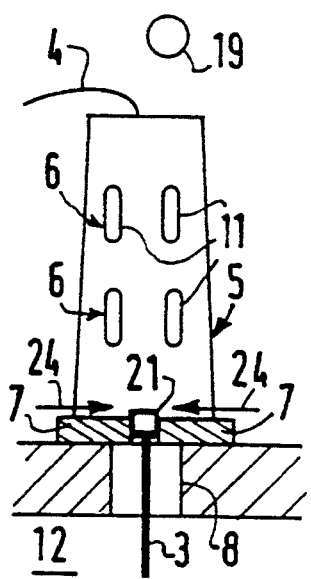
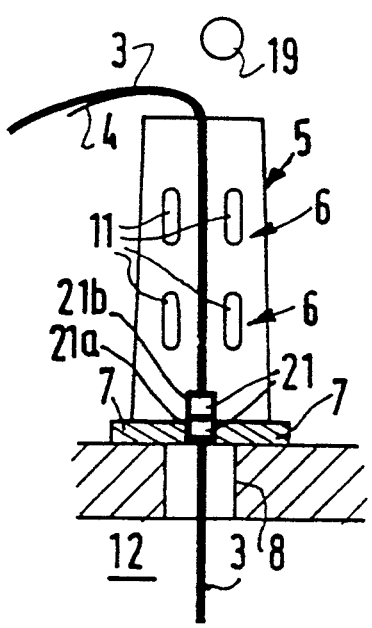
FIG. 2d     FIG. 2e     FIG. 2f

DEVICE AND PROCESS FOR UNROLLING FLEXIBLE TUBULAR CONDUITS ESSENTIALLY VERTICALLY

The invention mainly relates to a device and/or a ship equipped with this device to perform the laying of flexible conduits, in particular flexible tubular conduits comprising tensioning means placed on the vertical path of said flexible tubular conduits.

It is known to perform, from a ship, the laying of flexible tubular conduits. Such a conduit can be stored in a came with vertical axis, or in a drum with horizontal axis. The conduit is unrolled approximately horizontally from storage means.

The conduit is held by tensioning means assuring its suspension. The tensioning means support the mechanical tension coming from the weight of the unrolled conduit and thus prevent the storage means from sustaining this weight. After the tensioning means, the flexible tubular conduit passes over a deflecting element such as a wheel or a bent chute, placed, for example, at the back of the ship and assuring the guiding of the flexible conduit and the clearing of the edge of the ship, the axis of the conduit going from an approximately horizontal direction to a greatly inclined direction, the angle of inclination able to be of several degrees to about 15 to 20 degrees relative to the vertical. The conduit is immersed in the water to be deposited on the ocean floor. The tensioning means as well as the wheel assuring the transition from the horizontal path to the vertical path therefore must support the weight of the flexible tubular conduit between the ship and the floor as the laying ship advances. Tensioning means as well as the deflecting element must therefore be able to support the traction exerted by the part of the flexible conduit suspended between the ship and the floor. To be able to lay flexible conduits of relatively large diameter in great depths of water, tensioning means and deflecting elements are used whose dimensions and cost pose a problem, and which raises the fear of an excessive space requirement on the bridge of the laying ship.

To perform the laying, it is also known to use a piece of equipment such as a winch that combines storage functions and elements for tensioning the flexible conduit, which also necessitates making the flexible conduit go over a deflecting element to put it in the water. This winch, as well as the deflecting element become excessive in size and bulk when the diameter of the conduit and the water depth increase. As the diameter of the flexible tubular conduit and the depth increase, the size of the wheel becomes increasingly large. Such a wheel can have a diameter on the order of 10 meters for a depth approximately equal to 500 meters.

With the devices of known type, it is not possible to exceed this magnitude of depth. Wheels of larger diameter cannot easily be produced.

Moreover, there are problems of passage of the end fittings for connection of flexible tubular conduit sections to auxiliary accessories mounted on the flexible conduit, such as collars, stiffeners, buoys, anodes, etc., because these accessories, which are relatively rigid and whose outer crosswise dimension is greater than the outer diameter of the flexible conduits must pass over the deflecting element.

These problems can be solved, in a known manner, by using tilting gantries as described in French patent 85 05440 (published under no. 2 580267). But, just as in the case of known equipment for laying, such as tensioning means, winches and deflecting elements, it has been found, despite the advantages of such a device, that it becomes excessively bulky when the diameter of the flexible conduits and the water depth increase.

With the devices of known type, it is not possible to exceed a water depth on the order of 500 meters when the inner diameter of the flexible tubular conduit to be laid reaches about 30 cm.

This invention has as its object the laying of flexible conduits at depths approximately greater than those which are possible by using the known means, such as, for example, a depth on the order of 1000 to 2000 meters. The device according to this invention having to be able to support considerable tensile forces which can reach and even exceed 250 tons in the case of a conduit of a diameter approximately equal to 30 cm (12 inches according to English measurements) for a depth of 1000 meters. With the exception of sections comprising a rigid accessory, or of increased rigidity relative to the bending of the flexible conduit, and whose outer bulk exceeds the outside diameter of the flexible conduit, the continuous lengthwise lowering of a flexible tubular conduit is assured by the main tensioning means which absorb the mechanical tension exerted by the part of the flexible conduit suspended from the tensioning means between the laying ship and the floor. Under these conditions, the upstream tension of the tensioning means being exerted on the upstream part of the flexible conduit coming from the storage means is very low and, preferably, virtually insignificant. It has been found that under these conditions, it becomes possible to subject a conduit section located in the upstream part, between the storage means and the tensioning means, to a relatively great bending, the latter being explained by the fact that there not, in this case, a combination of the bending with an axial traction load. The device according to the invention also makes it possible, without resorting to bulky and sophisticated equipment, to perform changes imposed in the flexible conduit between the point where it is extracted from the storage means and the place where it enters the water, the axis of the hose having, for example, to go from a horizontal direction to an approximately vertical direction. It thus is possible to make the flexible conduit pass over a guiding element such as a bent trough or a wheel of small diameter, including the passage of rigid and bulky accessories mounted on the conduit. The tensioning means used are of linear winch type. It has been found that winches of this type make it possible to increase the axial tension load exerted by the flexible conduit and which must be absorbed by the tensioning means, which makes it possible, for a flexible conduit of given structure, to increase the water depth in which it can be laid.

In a general way, a winch is a piece of handling equipment which makes it possible to put a load in motion, the force being transmitted to the load through an elongated body, such as, for example, a cable, a wire, a flexible tubular conduit or a pipeline. The load can be the weight itself of the conduit and/or it can result from additional forces exerted, such as, for example, forces of friction, hydrodynamic forces, weight or resistance to the movement of an attached object. By linear winch is meant a winch for which the conduit portion on which the winch exerts its action is straight. In other words, the linear winch is characterized by the fact that the conduit is not subjected to any bending between the upstream area of the winch, consisting of the point where the conduit enters the winch with a mechanical tension $T_O$ and the downstream area of the winch consisting of the point where the conduit leaves the winch and where the axial tension in the conduit is greater than $T_O$. Various examples of linear winches are known, such as, for example, the tracked tensioning element of which an example is described in patent FR 2,089,215, a tire tensioning element of which an example is described in U.S. Pat. No. 3,589,580, a stepping clamp of which an example is described in patent U.S. Pat. No. 3,215,203, or a hybrid device, such as, for example, a tensioning element comprising two tracks and two tires, as illustrated in patent FR 2,601,828. Motorized drum winches, single- or double-drum capstans or multi-wheel capstans are not considered as linear winches.

Besides the linear winch, the device according to this invention comprises auxiliary holding means intended to absorb the lifting force of the flexible conduit during clearing of the linear winch by a rigid and bulky accessory. During this stage of clearing by the accessory, the linear winch is not used to take part in the absorption of the tension forces of the flexible conduit, and it is put into open position to free the central passage of sufficient crosswise dimension to allow the bulky accessory to pass freely.

For example, the elements for gripping by the winch, such as the endless tracks equipped with pads, or wheels equipped with tires, are mounted on at least two frames facing one another, the frames being placed to be able to be separated from one another laterally, which makes it possible to enlarge the crosswise dimension of the vertical passage.

Of course, the clearing of the main tensioning means can consist in the freeing of the flexible conduit and in the bypassing of the main tensioning means by the accessory, without going outside the scope of this invention.

The auxiliary holding means comprise at least mobile holding elements a first end of which is connected to the accessory mounted on the flexible conduit during the period of the phase of clearing of the linear winch by the accessory, the axial tensile force exerted by the flexible conduit being transmitted by the accessory to said mobile holding elements.

Advantageously, the mobile holding elements move in vertical planes containing the axis of the flexible conduit which are located between two frames supporting the gripping elements of the linear winch, to prevent an interaction between the mobile holding elements and the linear winch.

Advantageously, the auxiliary holding means comprise at least one, and preferably at least two elongated traction elements such as metal cables, cords or chains which act as mobile holding elements. In a preferred embodiment, the mobile holding elements consist of cables, the lower first end of which is attached to the accessory mounted on the flexible conduit, and which are wound at their second end on handling winches. Other known means such as hydraulic or mechanical cylinders can be used without going outside the scope of this invention.

In a particular embodiment, the auxiliary holding means further comprise stationary holding means which make it possible to assure the suspension without vertical displacement of the flexible conduit by the accessory mounted on the conduit, the accessory being carried by said stationary holding elements.

Advantageously, the stationary holding elements comprise a support table which is centered on the vertical axis of the main tensioning means, and preferably placed under the main tensioning means.

The support table has an open position which makes possible the free passage of accessories mounted on the conduit and a closed position which makes it possible to assure the support of said accessories to be able to suspend the flexible conduit by the accessory. Said closed position nevertheless makes possible the free passage of the flexible conduit in addition to the accessories.

The support table makes it possible to perform various necessary operations on the flexible tubular conduit. For example, the connection of successive sections of the flexible tubular conduit is performed. The connections are performed, for example, by clampings, screwings or by solderings of end fittings placed at the ends of each flexible tubular conduit section.

Advantageously, a central opening in the ship is used, called "moon pool" below in this patent, to perform the laying of the flexible tubular conduit. The use of the moon pool makes it possible to reduce to a minimum the dynamic lifting effects imposed on the flexible tubular conduit, for example, the movements of the ship, and which increase in a harmful way the traction supported by the flexible conduit.

Advantageously, the laying ship consists of a support structure such as a derrick to be able to support the main tensioning means, as well as the guiding elements such as inverted troughs or wheels. Further, the second end of the mobile holding elements can also be attached, directly or indirectly, to said support structure. Thus, for example, the winch or winches for handling cables used as mobile support elements are mounted on the derrick.

The invention mainly has as its object a device for laying, from a floating support, flexible conduits comprising rigid accessories, whose outer dimension is greater than the outer diameter of the conduit, characterized by the fact that it comprises main linear winch-type tensioning means making it possible to assure the standard lowering of the flexible conduit for its laying, said linear winch having an approximately vertical axis and comprising the last means for guiding the flexible conduit at the level of the floating support and auxiliary holding means which hold the flexible conduit by an accessory mounted on the flexible conduit, such as an end fitting or an auxiliary accessory and making possible the clearing of said main tensioning means by a flexible conduit section on which said accessory is mounted.

The invention also has as its object a device characterized by the fact that the main tensioning means comprise a plurality of tracks assuring the grasping of the outer surface of the flexible conduit.

The invention also has as its object a device characterized by the fact that the auxiliary holding means comprise at least one elongated traction element such as a cable able to be connected to said accessories mounted on the flexible conduit.

The invention also has as its object a device characterized by the fact that it comprises a winch for handling the elongated element.

The invention also has as its object a device characterized by the fact that the auxiliary holding means further comprise a support table which in a first open position allows the flexible conduit as well as the accessories mounted on the flexible conduit to pass, and in a second closed position, assures the support of a section of the flexible conduit by the end fitting mounted at the upper end of said section.

The invention also has as its object a device characterized by the fact that it comprises storage means of flexible conduits and guiding means assuring the gradual passage from the direction of the flexible conduit placed in the storage means to the approximately vertical direction of the main tensioning means.

The invention also has as its object a device characterized by the fact that the guiding means comprise a chute upstream from the main tensioning means.

The invention also has as its object a device characterized by the fact that it comprises a support structure such as a derrick installed on the floating laying support and making it possible to support the main tensioning means, the handling winch and the guiding means.

The invention also has as its object a process for laying flexible conduits from a floating support, characterized by the fact that it comprises stages consisting in:
  unrolling a section of flexible conduits grasped by its outside surface by main tensioning means of the linear winch type, the axis of the linear winch being approximately vertical, said linear winch absorbing the traction exerted by the flexible conduit and constituting the last guiding element of the flexible conduit aboard the floating support;
  absorbing the traction exerted by the flexible conduit by auxiliary holding means working in cooperation with a rigid accessory mounted on the flexible conduit and outer dimensions greater than the outer diameter of the flexible conduit;
  releasing the main tensioning means and separating them laterally to allow a free passage in the axis of the tensioning means of a dimension greater than the outer bulkiness of the accessory mounted on the flexible conduit;
  performing the clearing of the main tensioning means by the flexible conduit section on which the accessory is mounted, the tension exerted by the flexible conduit being supported by the auxiliary holding means while the flexible conduit is lowered through the free space between the main tensioning means;
  grasping by the main tensioning means the outer surface of the new flexible conduit section located upstream from the accessory so that the tension exerted by the flexible conduit can again be assumed by the main tensioning means;
  freeing the auxiliary holding means;
  taking up the unrolling of the new section of the flexible conduit.

The invention also has as its object a process characterized by the fact that the main tensioning means are of the type comprising a plurality of tracks and the auxiliary tensioning means comprise at least one winch.

The invention also has as its object a process characterized by the fact that the auxiliary holding means comprise at least two elongated traction elements, such as a cable handled by at least one winch and from which the accessory mounted on the flexible tubular conduit can be suspended.

The invention also has as its object a process characterized by the fact that the accessory mounted on the flexible conduit comprises an end fitting mounted at the upper end of a first flexible conduit section and said process further comprises, after the stage of clearing of the main tensioning means by said accessory and before the stage of grasping the flexible conduit by the main tensioning means, two intermediate stages consisting in:
  stopping the advance of the flexible conduit through the separated main tensioning means:
  bringing around, by lowering it through the free space between the separated main tensioning means, a second flexible conduit section, at the head of which an end fitting is mounted, and connecting the end fitting mounted at the head of the second section to the end fitting ending the first section of the flexible conduit.

The invention also has as its object a process characterized by the fact that the accessory mounted on the flexible conduit comprises an end fitting mounted at the upper end of a first flexible conduit section, said auxiliary holding means further comprise a support table which can take a first open position for which the diameter of inner passage of the table is greater than the outer bulkiness of the accessory mounted on the flexible conduit and a second closed position, in which the diameter of inner passage of the support table is less than the outer dimension of the accessory and greater than the outer diameter of the flexible conduit; said process further comprising, after the stage of clearing of the main tensioning means by said accessory and before the stage of grasping the flexible conduit by the main tensioning means, stages consisting in:
  assuring the passage of the flexible conduit through the separated main tensioning means until the lower face of said accessory mounted on the first flexible conduit section comes to rest on the support table which is in its second closed position, so that the traction exerted by the first conduit section is supported by the support table on which the accessory rests:
  detaching the traction elements from the accessory;
  bringing around, through the free space between the main tensioning means, a second flexible conduit section, at the head of which is mounted an end fitting, and connecting it to the end fitting ending the first flexible conduit section; as well as a later stage which consists in freeing the auxiliary holding means after the stage of grasping the flexible conduit by the main tensioning means and bringing the support table into its first open position.

The invention also has as its object a process characterized by the fact that the flexible conduit is a flexible tubular conduit.

The invention will be understood better by the following description and accompanying figures provided as nonlimiting examples of which:

FIGS. 2a–2h are explanatory diagrams of the use of a work table in the process according to this invention;

In FIGS. 1 to 3, the same references were used to designate the same elements.

Figure 1:
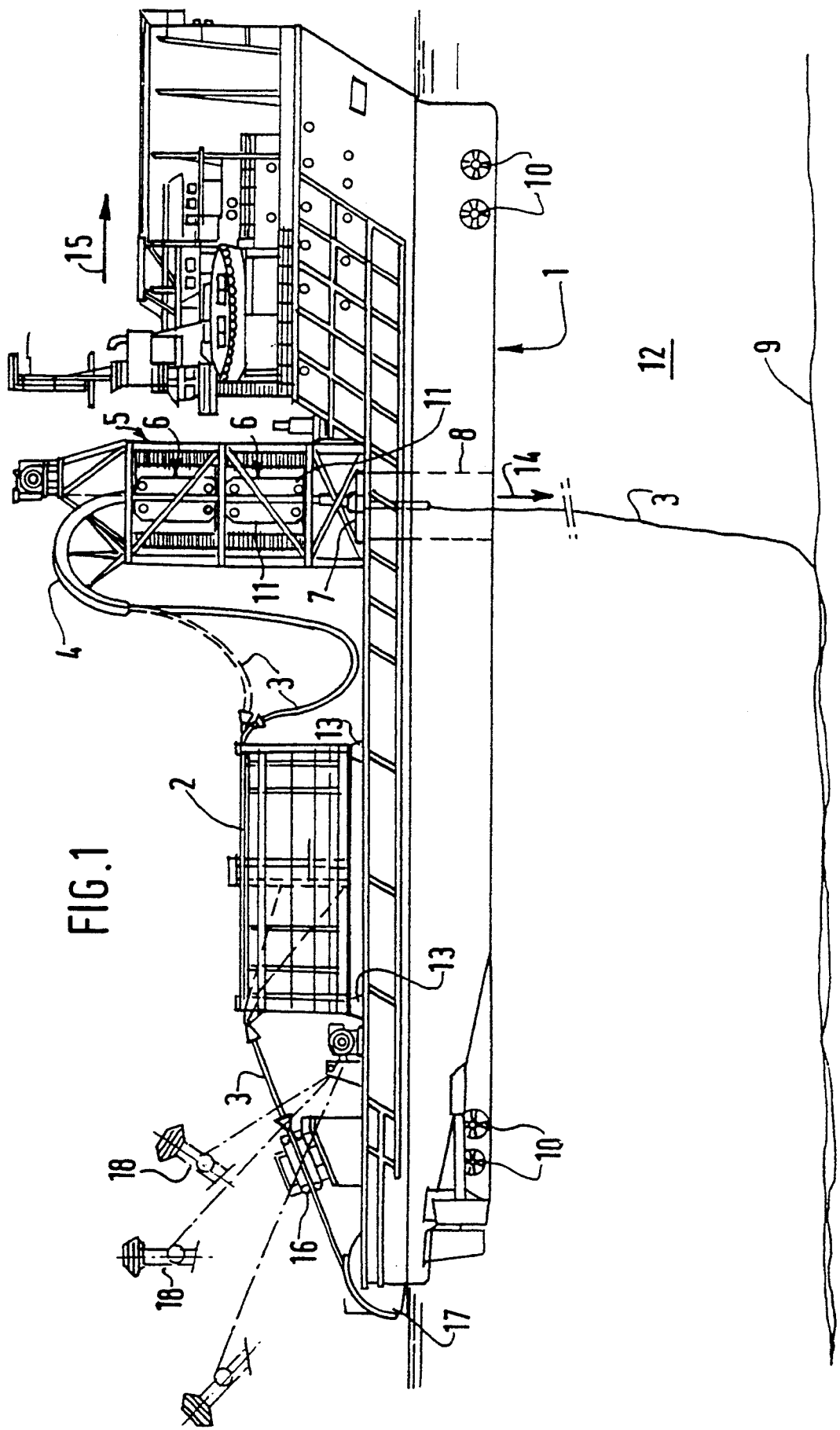
FIG. 1 is a profile view of a laying ship using the process according to this invention.

In FIG. 1, it is possible to see the laying ship equipped with the device according to this invention. In the figure, an example of laying ship 1 of improved type, comprising in particular dynamic positioning means 10, has been illustrated.

The device according to this invention comprises storage means 2 of flexible tubular conduit 3, guiding means 4 of flexible tubular conduit 3 and tensioning means 6 of the linear winch type.

Storage means 2 advantageously comprise a cage of approximately cylindrical shape with a vertical axis.

The guiding means comprise, for example, a wheel, or, as illustrated in the figure, a chute 4, making possible the passage of flexible tubular conduit 3 to a vertical direction. Between cage 2 and guiding means 4, flexible tubular conduit 3 takes the shape of a small chain. The small chain will be more or less concave depending on the length of the flexible conduit suspended between storage means 2 and guiding means 4. In the figure, an upper path corresponding, for example, to a flexible tubular conduit having an inner diameter approximately equal to 7.5 cm (3 inches according to English measurements), and an inner path, corresponding, for example, to a flexible tubular conduit having an inner diameter approximately equal to 30 cm (12 inches by using English measurements), have been illustrated.

Tensioning means 6 have been placed at the output of guiding means 4. In the example illustrated in the figure, two tensioning means 6 of multitrack type mounted on a derrick 5 of an approximately parallelepipedic rectangular shape have been placed in series. Each of said tensioning means 6 takes up a part of the load. Of course, the use of a single linear winch, in particular of the multitrack type, does not go outside the scope of this invention. Other shapes, for example, pyramidal, of derrick 5, do not go outside the scope of this invention. Tensioning means 6 are placed vertically downstream from guiding means 4, storage means 2 and upstream from a work table 7 making possible the handling of flexible tubular conduit 3. Tensioning means 6 are intended to support the weight of flexible tubular conduit 3 placed vertically up to ocean floor 9. Tensioning means 6 comprise, for example, a plurality of tracks 11. For example, each tensioning means 6 comprises 2, 3 or 4 tracks 11, which exert a tightening force on tubular conduit 3. The simultaneous advance of tracks 11 exerting the tightening force on tubular conduit 3 makes possible the lowering of tubular conduit 3 along arrow 14. Simultaneously, ship 1 advances along arrow 15.

The fact of using tensioning means 6 placed vertically makes it possible to make tubular conduit 3 pass by moon pool 8 of ship 1. This arrangement prevents having tensioning means 6 and chute 4 placed at the back or at the front of the ship. An offset position, for example, at the front or at the back of the ship and not in central position as the moon pool allows, causes an appreciable aggravation of the dynamic effects induced by the movements of the ship, hence a harmful increase of the axial tensile forces supported by the flexible conduit.

Advantageously, ship 1 comprises means making possible the transfer at sea of flexible tubular conduits 3 from a supply ship. In the example illustrated in the figure, the transfer means placed at the back comprise a chute 17, a tensioning means 16, a gantry 18 whose three positions have been represented in FIG. 1. Tensioning means 16 comprise, for example, two diametrically opposite tracks.

In FIG. 2, it is possible to see the process of laying sections of flexible tubular conduits 3, advantageously used in the process according to this invention.

In FIG. 2a, it is possible to see a normal stage of laying flexible tubular conduits 3. Work table 7 is open to make possible the passage of flexible tubular conduit 3 toward ocean 12. This is at the level of a flexible tubular conduit section whose end equipped with a fitting piece has not yet been reached. Each section of flexible tubular conduits 3 is ended by an end fitting 21, normally laid and tested in the factory. In the case where a defect is detected in flexible tubular conduit 3, it is possible to put an intermediate end fitting on a laying ship to reinforce or to eliminate a defective section of flexible tubular conduits 3. In such a case, it will be necessary to perform the test of flexible tubular conduit 3 on site.

As can be seen in FIG. 2b, end fitting 21a is attached to auxiliary holding means. For example, a cable 20 connected to a winch 19 is used. In the stage illustrated in FIG. 2b, tensioning means 6 assure the suspension of the suspended part of flexible tubular conduit 3. This is symbolized by the fact that cable 20 is not extended.

Tensioning means 6 are released. For example, in the case of using tensioning means 6 with tracks 11, the slides of tracks 11 are separated as illustrated by arrows 22 and 22'. Cable 20 is extended, winch 19 assuring the suspension of flexible tubular conduit 3 as illustrated in FIG. 2c.

The unrolling of cable 20 from winch 19, symbolized by arrow 14', makes it possible to bring end fitting 21 to the level of work table 7, as illustrated in FIG. 2d.

In FIG. 2e, the closing of work table 7 illustrated by arrows 24 is shown. At that moment, work table 7 assures the lifting of suspended flexible tubular conduit 3. Holding end fitting 21 is assured, for example, by shouldering, tightening or clamping. Cable 20 is freed.

As illustrated in FIG. 2f, a new section of flexible tubular conduit 3 ended by a second end fitting 21b is brought around. In contrast with the preceding section of flexible tubular conduit 3 unrolled over a great height, for example, over a height corresponding to the depth of 1000 m, new flexible tubular conduit 3 supports low tensile forces corresponding to its weight unrolled over the height of derrick 5.

The handlings necessary for the connection of two end fittings 21 to form a hydraulic connection, fluid tight to nominal pressure, and to assure a mechanical connection making possible in particular the suspension of a lower section of tubular conduit 3 by the new section are performed at the level of work table 7.

Figure 2G:
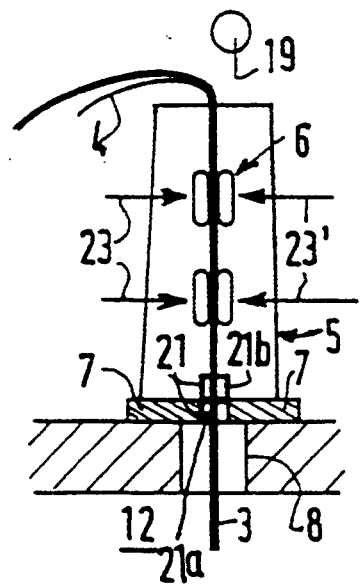

As illustrated by arrows 23 and 23' of FIG. 2g, tensioning means 6 are closed again to make possible the suspension of tubular conduit 3.

Figure 2H:
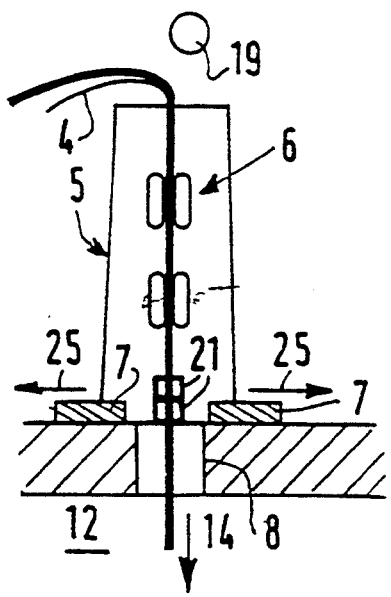

At that moment, it is possible, as illustrated by arrow 25 of FIG. 2h, to open work table 7. The laying of tubular conduit 3, symbolized by arrow 14, can be resumed using tensioning means 6.

In FIG. 3, it is possible to see a variant of the process of laying sections of flexible tubular conduits 3, according to this invention.

In the nonlimiting example illustrated in FIG. 3, tensioning means 6 comprise a single linear winch, comprising tracks 11. Of course, the use of a linear winch comprising a single train of tracks 11 for the use of the process of FIG. 2 does not go outside the scope of this invention.

Figure 3A:
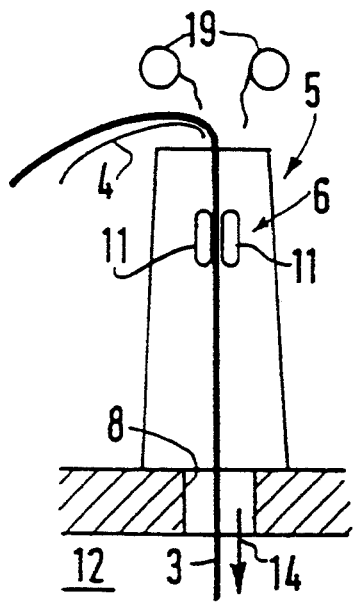
FIGS. 3a–3g are explanatory diagrams of the use of a winch in the process according to this invention.
Figure 3B:
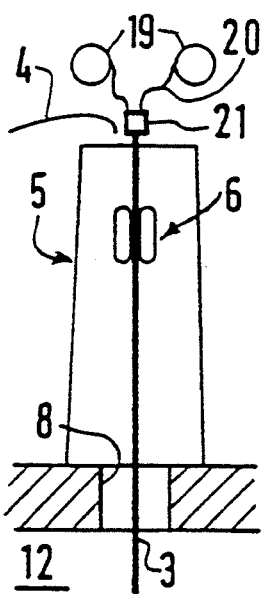

In FIG. 3a, it is possible to see a standard stage of laying flexible tubular conduits 3. This is at the level of a section of flexible conduits of which the end equipped with an end fitting has not yet been reached. Conduit 3 is unrolled into ocean 12 as symbolized by arrow 14. During this unrolling, tensioning means 6 comprising a linear winch which acts as a main tensioning means is used. In FIG. 3b, the end of a section of tubular conduit 3 ended by an end fitting 21a is reached. End fitting 21 is made integral with auxiliary holding means. In the example of FIG. 3, the auxiliary holding means comprise two cables 20 handled by two winches 19 placed symmetrically relative to the axis of conduit 3. In the example illustrated in FIG. 3b, main tensioning means 6 assure the suspension of the suspended part of flexible tubular conduit 3. This is symbolized by the fact that cables 20 are not extended.

Figure 3C:
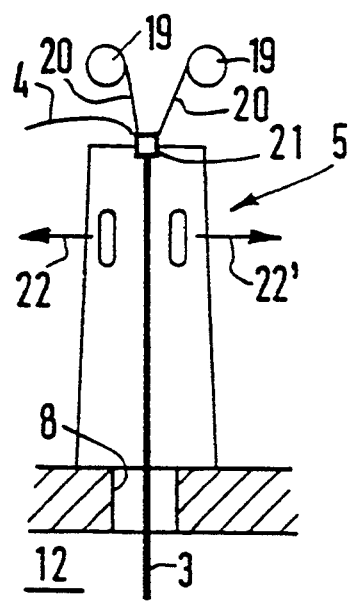
Figure 3D:
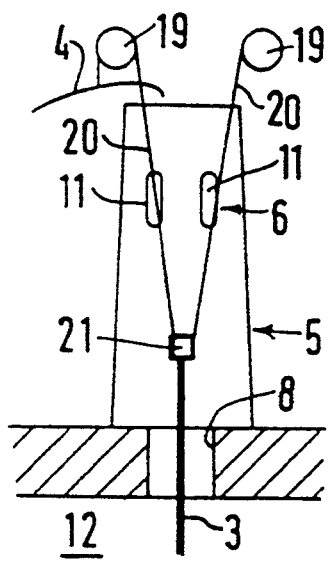

Main tensioning means 6 are released. For example, in the case of using a tensioning means 6 with tracks 11, the slide of tracks 11 is separated as illustrated by arrows 22, 22'. Cables 20 are extended, winch 19 assures the suspension of flexible tubular conduit 3 as illustrated in FIG. 3c. The unrolling of cables 20 from winches 19 makes possible the clearing by end fitting 21 of main tensioning means 6 comprising the linear winch, as illustrated in FIG. 3d.

Figure 3E:
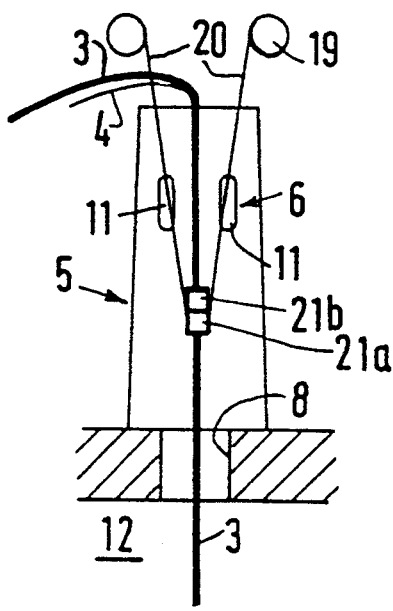

As illustrated in FIG. 3e, a new section of flexible tubular conduit 3 ended by a second end fitting 21b is brought around. In contrast with flexible tubular conduit 3 unrolled over a great height, for example, over a height corresponding to a depth of 1000 meters, new flexible tubular conduit 3 supports low tensile forces corresponding to its weight unrolled over the height of derrick 5 up to end fitting 21a of the section of lower flexible tubular conduit 3.

The handlings necessary for the connection of two end fittings 21 are performed, at the level of end fitting 21 of the lower section of flexible tubular conduit 3, to form an ocean-tight hydraulic connection at nominal pressure and to assure a mechanical connection making possible in particular the suspension of the lower section of tubular conduit 3 by the new section.

Figure 3F:
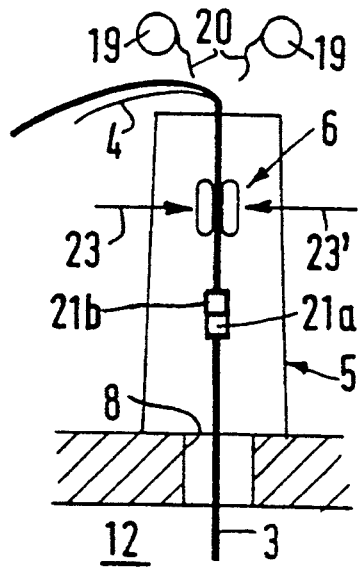
Figure 3G:
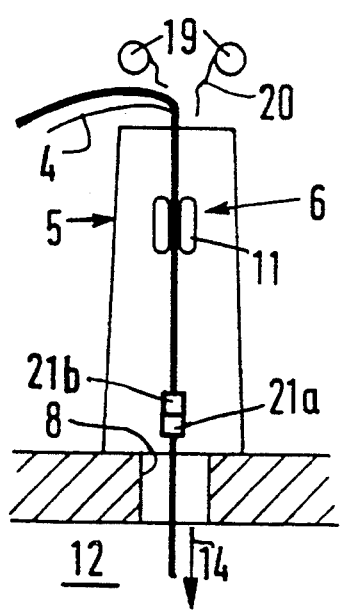

As illustrated by arrows 23, 23' in FIG. 3f, main tensioning means 6 close again to make possible the suspension of flexible tubular conduit 3. At that moment, cables 20 are disengaged from end fitting 21a of the lower section of flexible tubular conduit 3. Main tensioning means 6 assures the suspension of the conduit. The laying of flexible tubular conduit 3, symbolized by arrow 14, can be resumed using main tensioning means 6.

According to another variant of the laying process according to the invention, not illustrated, it is possible to perform the laying of a continuous flexible conduit comprising a relatively rigid and bulky auxiliary accessory, i.e., whose crosswise dimensions exceed the outer diameter of the flexible conduit on which it is mounted.

The operation consisting in making said accessories pass by the linear winch can be performed in a way similar to the operation described in FIG. 3, the difference being that flexible conduit 3 is continuous without interruption on both sides of accessory 21. It therefore is not necessary, as illustrated in FIG. 3e, to bring around a new flexible conduit section to connect its end fitting 21b to end fitting 21a of the first section. It is sufficient to grasp accessory 21 with the: end of cables 20 at the moment when it goes out from chute 4 to be vertical from linear winch 6, the traction of the conduit being absorbed by cables 20 and the slides of tensioning element 6 are separated. The lowering of flexible conduit 3 continues, the conduit being held by cables 20 lowered from winch 19. Once linear winch 6 is cleared by accessory 21, it is possible to tighten winch 6 again on the conduit and to resume the continuation of the laying from winch 6, cables 20 having been disconnected from accessory 21. Flexible tubular conduit 3 leaves the linear winch with a considerable inclination, the angle that it exhibits relative to the vertical being able to vary as a function of the water depth and circumstances of the laying operation. This angle can now be 5 to 10 degrees, but it can also be extremely low, the conduit being almost vertical, in particular by a great water depth; or else reach about 15 degrees. One of the original features of the invention resides in the absence of any guiding means of the flexible tubular conduit after it has left the main tensioning means. However, it should be noted that main tensioning means 6 can themselves assure a guiding and a deflection relative to the vertical flexible tubular conduit 3. For example, the multitrack tensioning means now make possible a deflection relative to the vertical of more or less 10° to 15°.

Although the invention has been described in relation flexible tubular conduits, the laying of other flexible conduits, of course, does not go outside the scope of this invention. It is possible to use the device and the process according to this invention, in particular for laying cables, for example, traction cables, and particularly electric cables. By electric cables is meant any cable comprising electric conductors, both the power cables and the cables conveying data.

The invention mainly applies to the laying in the deep sea (depth greater than 900 m) of flexible tubular conduits.

We claim:

1. Device for laying, from a floating support, flexible conduits comprising rigid accessories, whose outer dimension is greater than the outer diameter of the conduit, comprising:
   first linear winch-type tensioning means (6) for lowering said flexible conduit (3) and supporting the weight of said flexible conduit, said first linear winch-type tensioning means having an approximately vertical axis and comprising guiding means for guiding said flexible conduit at a substantially vertical position at a of said floating support (1),
   auxiliary holding means (19) for holding said flexible conduit to lower said flexible conduit and support the weight of said flexible conduit during passage of an accessory (21) mounted on said flexible conduit within the first tensioning means, said [auxiliary holding]first tensioning means being in an open position during passage of said accessory mounted on said flexible conduit within the first tensioning means.

2. Device according to claim 1, wherein main tensioning means (6) comprise a plurality of caterpillars (11) assuring the grasping of the outer surface of flexible conduit (3).

3. Device according to claim 1, wherein the auxiliary holding means comprise at least one elongated traction element (20) such as a cable able to be connected to said accessories mounted on the flexible conduit.

4. Device according to claim 3, wherein it comprises a winch 19 for handling elongated element (20).

5. Device according to claim 1, wherein auxiliary holding means (19) further comprise a support table (7) which, in a first open position, allows flexible conduit (3) as well as accessories (21) mounted on flexible conduit (3) to pass and, in a second closed position, assure the support of a section of flexible conduit (3) by end fitting (21) mounted at the upper end of said section.

6. Device according to claim 1, wherein it comprises storage means (2) of flexible conduits (3) and guiding means (4) assuring the gradual passage from the direction of a flexible conduit placed in storage means (2) to the approximately vertical direction of main tensioning means (6).

7. Device according to claim 6, wherein guiding means (4) comprise a chute upstream from main tensioning means (6).

8. Device according to claim 4, wherein it comprises a support structure (5) such as a derrick installed on floating laying support (1) and making it possible to support main tensioning means (6), handling winch (19) and guiding means (4).

9. Process for laying flexible conduits from a floating support, wherein it comprises stages consisting in:
   unrolling a section of flexible tubular conduits grasped by its outer surface by main tensioning means (6) of linear winch type, the axis of the linear winch being approximately vertical, said linear winch absorbing the traction exerted by flexible conduit (3) and constituting the last guiding element of the flexible conduit aboard floating support (1);
   absorbing the traction exerted by flexible conduit (3) by auxiliary holding means working in cooperation with a rigid accessory (21) mounted on the flexible conduit and outer dimensions greater than the outer diameter of the flexible conduit, this accessory being mounted on the flexible conduit;
   releasing main tensioning means (6) and separating them laterally to allow a free passage in the axis of the tensioning means of greater dimension than the outer bulkiness of the accessory mounted on the flexible conduit;
   performing the clearing of main tensioning means (6) by the section of flexible conduit on which is mounted the accessory, the tension exerted by flexible conduit (3) being supported by auxiliary holding means (20) while flexible conduit (3) is lowered through the free space between the main tensioning means;
   grasping by main tensioning means (6) the outer surface of the new section of flexible conduit (3) located upstream from the accessory so that the tension exerted by the flexible conduit can again be assumed by main tensioning means (6);
   releasing the auxiliary holding means;
   taking up the unrolling of the new section of tubular conduit (3).

10. Process according to claim 9, wherein main tensioning means (6) are of the type comprising a plurality of tracks and wherein auxiliary tensioning means (20) comprise at least one winch.

11. Process according to claim 9, wherein the auxiliary holding means comprise at least two elongated traction elements, such as a cable handled by at least one winch (19) and from which the accessory mounted on the flexible tubular conduit can be suspended.

12. Process according to claim 9, wherein the accessory mounted on flexible conduit (3) comprises an end fitting (21a) mounted at the upper end of a first section of flexible conduit (3) and wherein said process further comprises, after the stage of clearing of main tensioning means (6) by said accessory, and before the stage of grasping the flexible conduit (3) by main tensioning means (6), two intermediate stages consisting in:
   stopping the advance of flexible conduit (3) through separated main tensioning means (6);
   bringing around, by lowering it through the free space between the separated main tensioning means, a second section of flexible conduit (3) at the head of which an end fitting (21b) is mounted, and connecting end fitting (21b) mounted at the head of the second section to end fitting (21a) ending the first section of flexible conduit (3).

13. Process according to claim 11, wherein the accessory mounted on the flexible conduit comprises an end fitting (21a) mounted at the upper end of a first section of flexible conduit (3), wherein said auxiliary holding means further comprise a support table (7) which can take a first open position for which the diameter of inner passage of the table is greater than the outer bulkiness of accessory (21) mounted on flexible conduit (3) and a second closed position, in which the diameter of inner passage of support table (7) is less then the outside dimension of accessory (21, 21a) and greater than the outside diameter of flexible conduit (3); said process further comprising, after the stage of clearing of main tensioning means (6) by said accessory, and before the stage of grasping the flexible conduit by the main tensioning means, stages consisting in:
   assuring the advance of the flexible conduit through separated main tensioning means (6) until the inner face of said accessory mounted on the first flexible conduit section comes to rest on the support table which is in its second closed position, so that the traction exerted by the first conduit section is supported by support table (7) on which accessory (21a) rests;
   detaching traction elements (20) from accessory (21a);
   bringing around, through the free space between main tensioning means (6), a second flexible conduit section (3) at the head of which is mounted an end fitting (21b) and connecting it to end fitting (21a) ending the first section of flexible conduit (3); as well as a later stage which consists in freeing the auxiliary holding means after the stage of grasping flexible conduit (3) by main tensioning means (6) and bringing support table (7) into its first open position.

14. Process according to claim 9, wherein flexible conduit (3) is a flexible tubular conduit.

* * * * *

UNITED STATES PATENT AND TRADEMARK OFFICE
CERTIFICATE OF CORRECTION

PATENT NO. : 5,348,423
DATED : September 20, 1994
INVENTOR(S) : Maloberti et al

It is certified that error appears in the above-indentified patent and that said Letters Patent is hereby corrected as shown below:

Claim 1, in column 10, line 36, after "a" insert --level--, and
Claim 1, lines 41-42, delete "auxiliary holding".

Signed and Sealed this

Twenty-seventh Day of December, 1994

Attest:

BRUCE LEHMAN

Attesting Officer     Commissioner of Patents and Trademarks

REEXAMINATION CERTIFICATE (3148th)
United States Patent [19]
Maloberti et al.

[11] B1 5,348,423
[45] Certificate Issued Mar. 4, 1997

[54] DEVICE AND PROCESS FOR UNROLLING FLEXIBLE TUBULAR CONDUITS ESSENTIALLY VERTICALLY

[75] Inventors: René Maloberti, Champigny; Alain Coutarel, Paris, both of France; Philippe F. Espinasse, Rio de Janerio, Brazil

[73] Assignee: Coflexip, Boulogne-Billancourt, France

Reexamination Request:
No. 90/003,930, Aug. 29, 1995

Reexamination Certificate for:
Patent No.: 5,348,423
Issued: Sep. 20, 1994
Appl. No.: 776,394
Filed: Jan. 29, 1992

Certificate of Correction issued Dec. 27, 1994.

[22] PCT Filed: Apr. 2, 1991
[86] PCT No.: PCT/FR91/00264
§ 371 Date: Jan. 29, 1992
§ 102(e) Date: Jan. 29, 1992
[87] PCT Pub. No.: WO91/15699
PCT Pub. Date: Oct. 17, 1991

[30] Foreign Application Priority Data
Mar. 30, 1990 [FR] France .................................. 90 04105

[51] Int. Cl.⁶ ...................................................... F16L 1/18
[52] U.S. Cl. .................... 405/166; 405/168.3; 405/168.4
[58] Field of Search ................................. 405/166, 167, 405/170, 171, 169, 168.1, 168.2

[56] References Cited

U.S. PATENT DOCUMENTS

| | | |
|---|---|---|
| 1,716,229 | 6/1929 | Immel . |
| 3,340,826 | 4/1969 | Kline ........................................ 405/166 |
| 3,389,563 | 6/1968 | Postlewaite et al. .................... 405/166 |
| 3,581,506 | 6/1971 | Howard . |
| 3,685,306 | 8/1972 | Mott ..................................... 405/168.3 |
| 4,196,334 | 4/1980 | Thome .............................. 405/170 X |

OTHER PUBLICATIONS

Guegen, J. M., "Latest Trends in Deep Water Flexible Risers", 4th Deep Offshore Technology International Conference Proc. V I, Pap. No. 19, 1987, pp. 1.9/136–154.

*Primary Examiner*—Dennis L. Taylor

[57] ABSTRACT

A device for laying flexible tubular conduits from a floating support comprises rigid accessories the outer diameter of which is greater than the outer diameter of the conduit. It comprises main, linear winch-type tensioning means (6) for normal lowering of the flexible conduit (3) to be laid. The linear winch has an essentially vertical axis and comprises the last means for guiding the flexible conduit at the level of the floating support (1) and auxiliary holding means (19) which hold the flexible conduit by means of an accessory (21) mounted on the flexible conduit, such as an end fitting or an auxiliary accessory, and enable the main tensioning means (6) to clear a section of flexible conduit on which the accessory (21) is mounted.

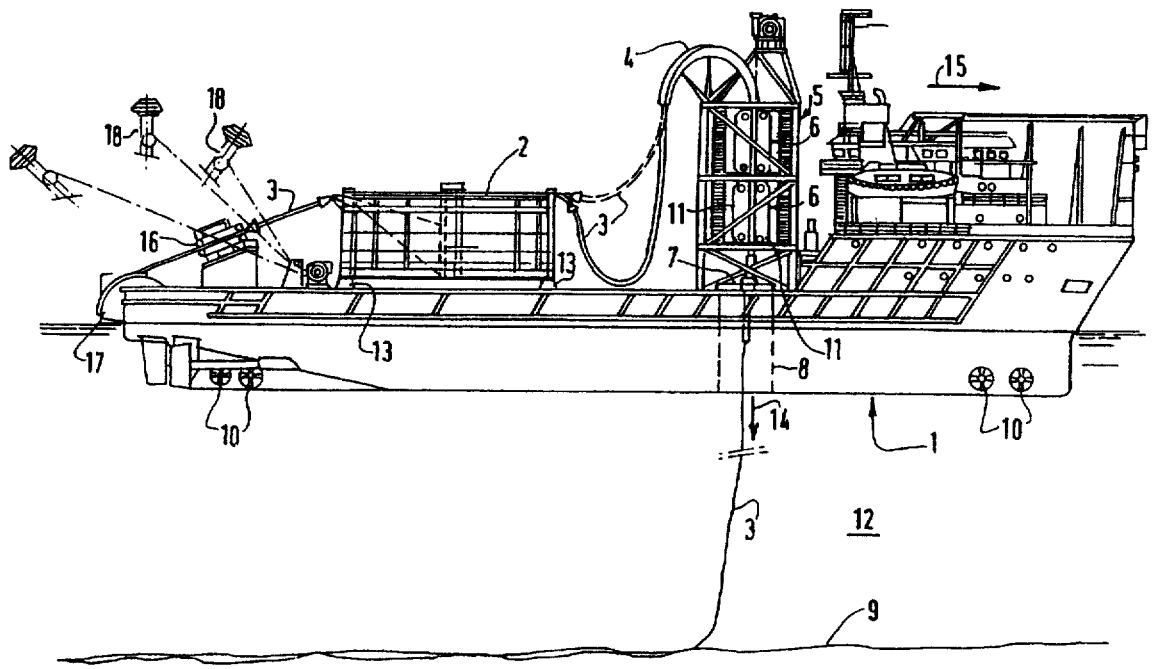

B1 5,348,423

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 9–13 and 14 is confirmed.

Claims 1–7 and 8 are cancelled.

\* \* \* \* \*